US012068559B2

(12) United States Patent
Nozaki

(10) Patent No.: US 12,068,559 B2
(45) Date of Patent: Aug. 20, 2024

(54) CONNECTOR FOR HOLDING FLEXIBLE PRINTED CIRCUIT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Shinji Nozaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/787,110

(22) PCT Filed: Dec. 7, 2020

(86) PCT No.: PCT/JP2020/045364
§ 371 (c)(1),
(2) Date: Jun. 17, 2022

(87) PCT Pub. No.: WO2021/131625
PCT Pub. Date: Jul. 1, 2021

(65) Prior Publication Data

US 2023/0033186 A1 Feb. 2, 2023

(30) Foreign Application Priority Data

Dec. 27, 2019 (JP) ................................ 2019-237964

(51) Int. Cl.
*H01R 13/635* (2006.01)

(52) U.S. Cl.
CPC ................................ *H01R 13/635* (2013.01)

(58) Field of Classification Search
CPC .... H01R 13/635; H01R 12/77; H01R 12/771; H01R 12/774; H01R 12/79
See application file for complete search history.

(56) References Cited

U.S. PATENT DOCUMENTS 6,213,802 B1 * 4/2001 Wu ....................... H01R 12/89
439/492
6,345,998 B1 * 2/2002 Lee ....................... H01R 12/79
439/495

(Continued)

FOREIGN PATENT DOCUMENTS

JP H04-253176 A 9/1992
JP 2002-093503 A 3/2002

(Continued)

OTHER PUBLICATIONS

International Search Report issued on Feb. 2, 2021 for WO 2021/131625 A1 (4 pages).

*Primary Examiner* — Vanessa Girardi
(74) *Attorney, Agent, or Firm* — Venjuris, P.C.

(57) ABSTRACT

It is aimed to provide a connector capable of satisfactorily holding a board even in a high-temperature and high-humidity atmosphere. A connector is provided with a connector housing including a board accommodation space, a terminal fitting mounted in the connector housing to face the board accommodation space, and a retainer for sandwiching and holding a flexible board arranged in the board accommodation space between the terminal fitting and the retainer. A state of the retainer changes to a pressing state for pressing the flexible board toward the terminal fitting and a non-pressing state for releasing pressing to the flexible board. The retainer is made of metal.

7 Claims, 12 Drawing Sheets

(56) References Cited

U.S. PATENT DOCUMENTS

| | | | | |
|---|---|---|---|---|
| 10,847,911 | B2 * | 11/2020 | Chi | H01R 12/88 |
| 2003/0220013 | A1 | 11/2003 | Lee | |
| 2008/0305659 | A1 | 12/2008 | Hemmi et al. | |

FOREIGN PATENT DOCUMENTS

| | | | |
|---|---|---|---|
| JP | 2008-053123 | A | 3/2008 |
| JP | 2011-216422 | A | 10/2011 |
| JP | 2015-056338 | A | 3/2015 |

* cited by examiner

CONNECTOR FOR HOLDING FLEXIBLE PRINTED CIRCUIT

CROSS REFERENCE TO RELATED APPLICATIONS

This application is a national phase of PCT application No. PCT/JP2020/045364, filed on 7 Dec. 2020, which claims priority from Japanese patent application No. 2019-237964, filed on 27 Dec. 2019, all of which are incorporated herein by reference.

TECHNICAL FIELD

The present disclosure relates to a connector.

BACKGROUND

Patent Document 1 discloses a connector in which a first connection terminal and a second connection terminal corresponding to the first connection terminal are mounted on a base. The first connection terminal includes an operation contact piece having an operation receiving portion on one end and a movable contact point adjacent to the second connection terminal on the other end. The base is provided with an operation lever for pushing up the operation receiving portion by an operation cam by being operated. In this connector, by operating the operation lever, the operation receiving portion located on one side across a coupling portion is pushed up by the operation cam and the movable contact point on the other side across the coupling portion approaches the second connection terminal. In this way, FPCs (Flexible Printed Circuits) are sandwiched and held by the movable contact point and the second connection terminal.

PRIOR ART DOCUMENT

Patent Document

Patent Document 1: JP 2008-305621 A

SUMMARY OF THE INVENTION

Problems to be Solved

In the configuration of Patent Document 1, for example, if a plurality of first connection terminals are arranged side by side, the operation cam (operation lever) configured to contact the first connection terminals needs to be, for example, made of a nonconductive material such as a synthetic resin. In this case, if this connector is exposed to a high-temperature and high-humidity atmosphere for a long period of time, the operation cam may be gradually deformed by a reaction force of the pushed-up operation receiving portion and a force for holding the FPCs may become weak.

Accordingly, the present disclosure aims to provide a connector capable of satisfactorily holding a board even in a high-temperature and high-humidity atmosphere.

Means to Solve the Problem

The present disclosure is directed to a connector with a connector housing including a board accommodation space, a terminal fitting mounted in the connector housing to face the board accommodation space, and a retainer for sandwiching and holding a flexible board arranged in the board accommodation space between the terminal fitting and the retainer, wherein a state of the retainer changes to a pressing state for pressing the flexible board toward the terminal fitting and a non-pressing state for releasing pressing to the flexible board, and the retainer is made of metal.

Effect of the Invention

According to the present disclosure, it is possible to provide a connector capable of satisfactorily holding a board even in a high-temperature and high-humidity atmosphere.

DETAILED DESCRIPTION TO EXECUTE THE INVENTION

Description of Embodiments of Present Disclosure

Figure 1:
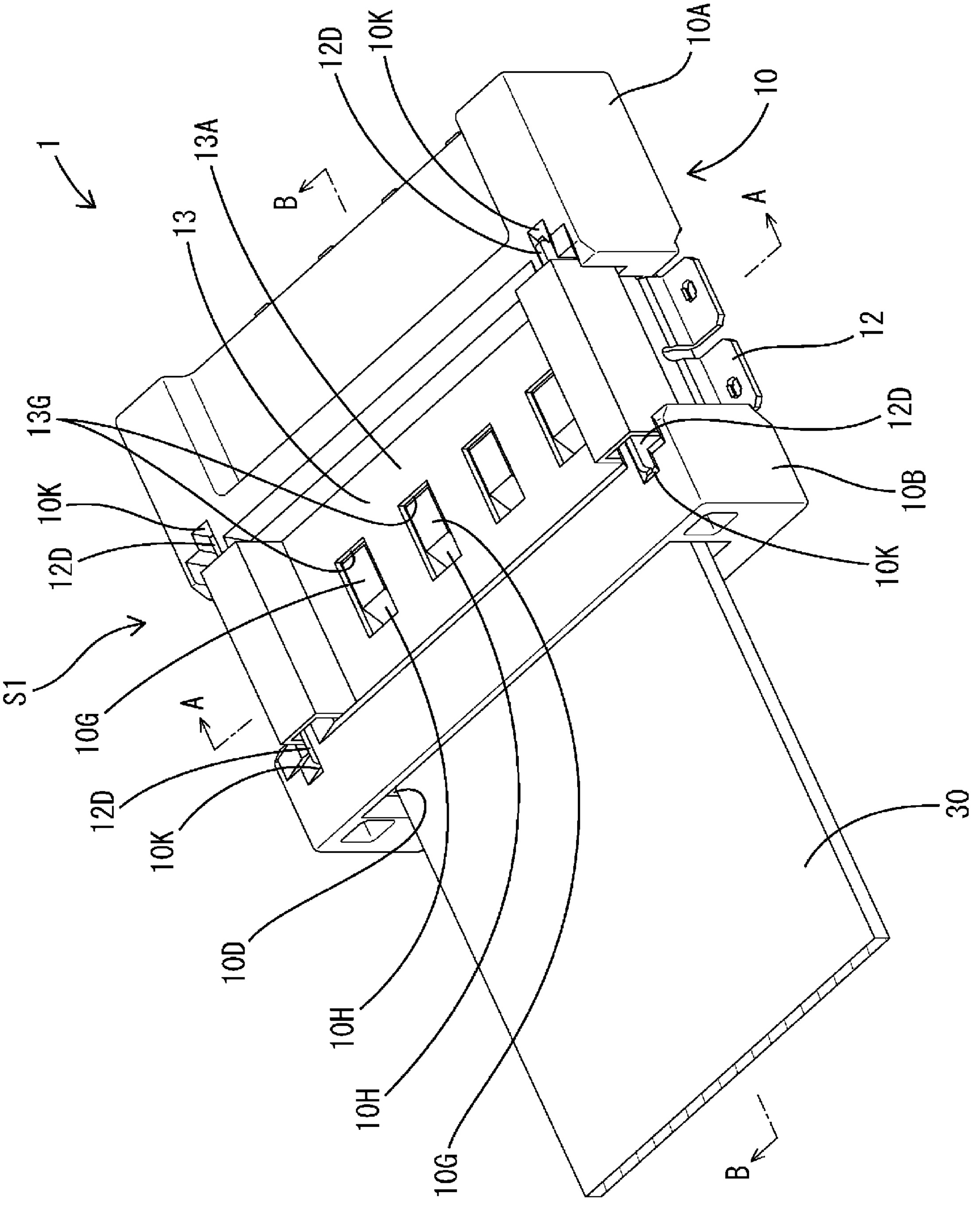
FIG. 1 is a perspective view showing a state where a flexible board is arranged in a board accommodation space and a retainer is in a pressing state in a connector of a first embodiment.

First, embodiments of the present disclosure are listed and described.

(1) The connector of the present disclosure is provided with a connector housing including a board accommodation space, a terminal fitting mounted in the connector housing to face the board accommodation space, and a retainer for sandwiching and holding a flexible board arranged in the board accommodation space between the terminal fitting and the retainer, wherein a state of the retainer changes to a pressing state for pressing the flexible board toward the terminal fitting and a non-pressing state for releasing pressing to the flexible board, and the retainer is made of metal.

According to the configuration of the present disclosure, since the retainer is made of metal, the retainer is less likely to be deformed even if this connector is exposed to a high-temperature and high-humidity atmosphere for a long period of time.

(2) Preferably, the connector of the present disclosure is provided with a resilient pressing piece for resiliently pressing the flexible board and bringing the flexible board and the terminal fitting into contact when the retainer is in the pressing state.

According to this configuration, even if a dimension between the flexible board and the terminal fitting varies, the flexible board and the terminal fitting can be reliably brought into conduction by the resilient pressing piece.

(3) Preferably, a plurality of the terminal fittings are provided in the connector housing of the connector of the present disclosure, and a plurality of the resilient pressing pieces are arranged to respectively correspond to the plurality of terminal fittings.

According to this configuration, even if positional relationships of the plurality of terminal fittings with a board vary, a connected state of each terminal fitting and the board can be satisfactorily established by the resilient pressing piece corresponding to each terminal fitting.

(4) Preferably, the connector housing of the connector of the present disclosure includes a wall portion partitioning between adjacent ones of the terminal fittings, the flexible board includes a plurality of patterns to be individually connected to the plurality of terminal fittings, the flexible board is formed with an insertion portion by cutting between adjacent ones of the patterns, and the wall portion is inserted through the insertion portion.

According to this configuration, a creepage distance between the adjacent patterns formed on the flexible board can be secured by the wall portion.

(5) Preferably, the resilient pressing piece of the connector of the present disclosure is provided in at least either one of the retainer and the terminal fitting.

According to this configuration, since the resilient pressing piece is provided in either one of components for sandwiching the flexible board, the number of components can be reduced as compared to the case where the resilient pressing piece is provided separately.

(6) Preferably, a peg for holding the connector housing mounted on a board is mounted on the connector housing, and the retainer is in the pressing state when being in a first arrangement state with respect to the peg and is in the non-pressing state when being in a second arrangement state with respect to the peg.

According to this configuration, since the peg is separate from the connector housing, a material of the peg can be different from that of the connector housing. Since this enables the selection of a material, which is not worn or deformed even if the retainer made of metal is mounted, as the material of the peg, the retainer can be reliably held in the pressing state.

(7) Preferably, the retainer of the connector of the present disclosure includes a shaft portion to be locked to the peg, and the state of the retainer changes to the pressing state and the non-pressing state by the retainer being rotated about the shaft portion.

According to this configuration, the state of the retainer can be easily changed from the non-pressing state to the pressing state without performing an operation of positioning the retainer with respect to the connector housing.

DETAILS OF EMBODIMENTS OF PRESENT DISCLOSURE

First Embodiment

Hereinafter, a connector 1 according to a first embodiment of the present disclosure is described with reference to FIGS. 1 to 3. The connector 1 according to the first embodiment includes a connector housing 10, terminal fittings 11, pegs 12 and a retainer 13. The connector 1 electrically connects a flexible board 30 and the terminal fittings 11. Note that, in the following description, a side on which the flexible board 30 is inserted into the connector housing 10 (left side in FIG. 3) is referred to as a front side concerning a front-rear direction, and upper and lower sides in FIG. 3 are defined as upper and lower sides concerning a vertical direction. Left and right sides in FIG. 2 are defined as left and right sides concerning a lateral direction.

[Configuration of Connector]

The connector housing 10 is made of synthetic resin and includes a terminal holding portion 10A having a substantially rectangular parallelepiped shape and a board insertion portion 10B formed in front of the terminal holding portion 10A. The terminal holding portion 10A includes cavities 10E (see FIG. 3). A plurality of the cavities 10E extending in the front-rear direction are aligned and arranged in the lateral direction (see FIG. 2). The front end of each cavity 10E is closed. The terminal fitting 11 to be described later is inserted into each cavity 10E from behind. The connector housing 10 is provided with a plurality of the terminal fittings 11. A board accommodation space S1 open on an upper side is formed on front sides of the cavities 10E. In the first embodiment, the board accommodation space S1 is an open region above the cavities 10E. The connector housing 10 includes the board accommodation space S1.

Figure 2:
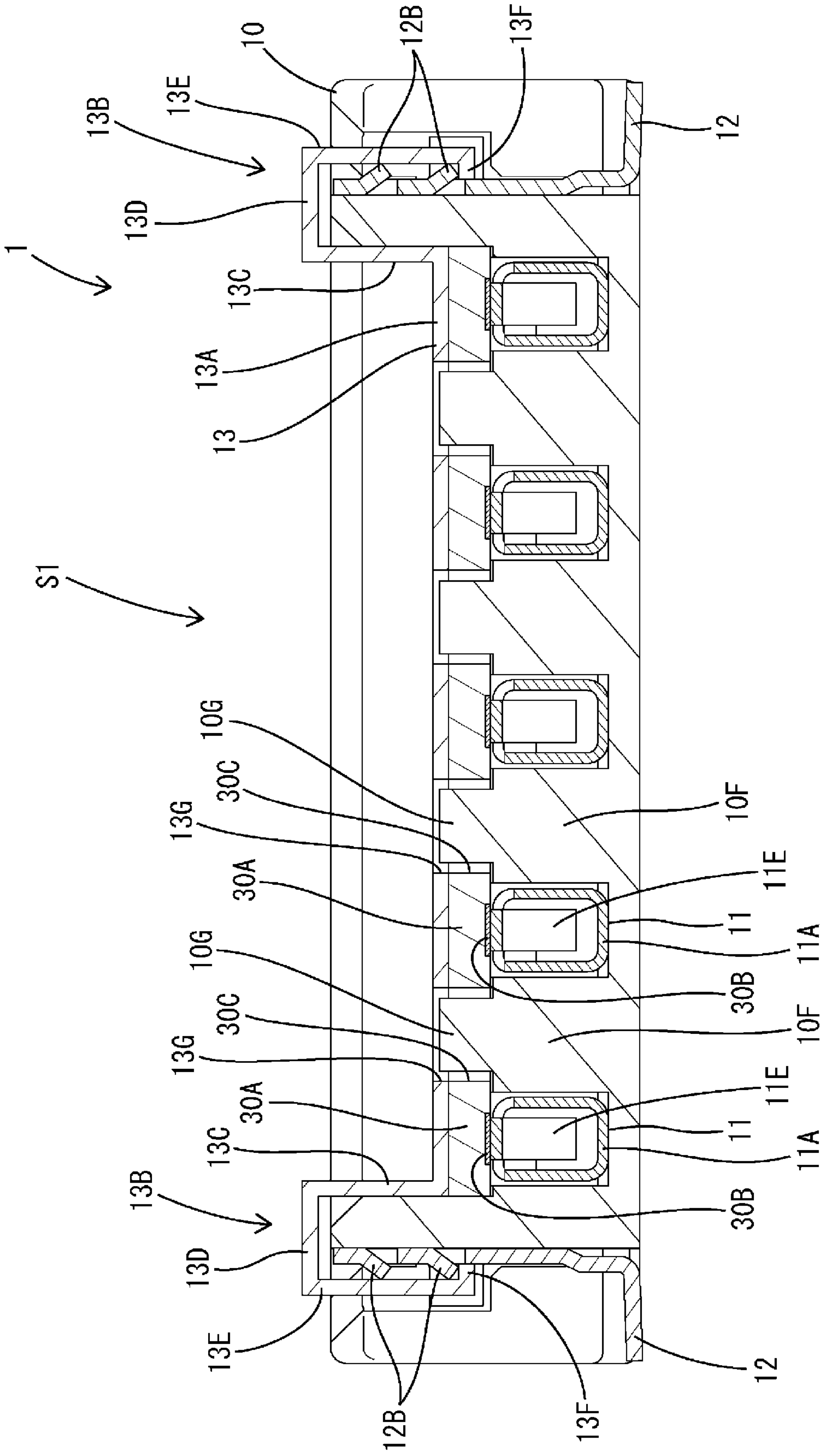
FIG. 2 is a section along A-A in FIG. 1.
Figure 3:
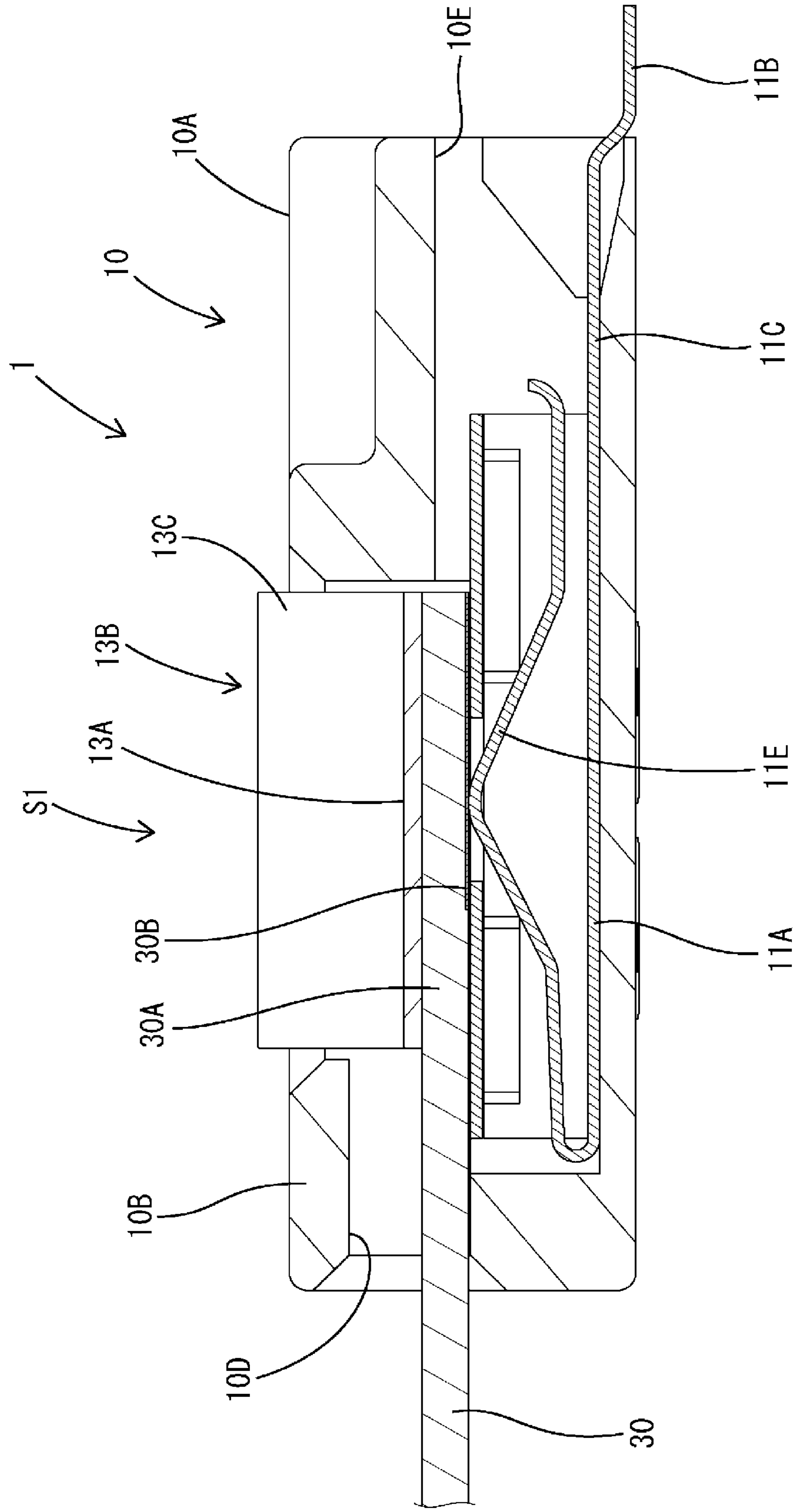
FIG. 3 is a section along B-B in FIG. 1.

In the board accommodation space S1, wall portions 10F partitioning between adjacent ones of the cavities 10E are provided between the adjacent cavities 10E (see FIG. 2). A projecting portion 10G projecting upward is provided in a central part in the front-rear direction of each wall portion 10F (see FIGS. 1 and 2). Each wall portion 10F functions to partition between adjacent ones of the terminal fittings 11. A front side of each projecting portion 10G is formed with an inclined surface 10H inclined downward to the front (see FIG. 1).

The board insertion portion 10B is formed with a slit 10D penetrating in the front-rear direction and long in an arrangement direction of the cavities 10E (see FIG. 3). The peripheral edge of the slit 10D on the front end of the board insertion portion 10B is chamfered (see FIG. 3).

The terminal fitting 11 is integrally formed, such as by bending an electrically conductive metal plate. As shown in FIG. 3, the terminal fitting 11 is shaped to be elongated in the front-rear direction as a whole. The terminal fitting 11 includes a tubular terminal body 11A and a board connecting portion 11B connected behind the terminal body 11A via a press-fit portion 11C. The terminal body 11A includes a plate-like spring piece 11E, which is a resilient pressing piece. The spring piece 11E resiliently contacts an electrode 30B, which is a pattern formed on the flexible board 30 inserted through the board insertion portion 10B and arranged in the board accommodation space S. In this way, the spring piece 11E functions as a means for connecting the flexible board 30 and the terminal body 11 with a predetermined contact pressure. The spring piece 11E is folded from the front end edge of the terminal body 11A, extends toward a rear end and is accommodated in the terminal body 11A. A central part in the front-rear direction of the spring piece 11E is formed to project further upward than the upper surface of the terminal body 11A. That is, a plurality of the spring pieces 11E are arranged to respectively correspond to the plurality of terminal fittings 11.

The board connecting portion 11B is electrically connected to a pattern formed on an unillustrated board. The terminal fitting 11 includes the press-fit portion 11C between the terminal body 11A and the board connecting portion 11B. A plurality of projections (not shown) are provided on both left and right side surfaces of the press-fit portion 11C.

If the press-fit portion 11C is press-fit into a rear end part of the cavity 10E, the respective projections bite into both side surfaces of a rear end part of the cavity 10E to be locked and the terminal fitting 11 is retained and held in the connector housing 10. The terminal body 11A of the terminal fitting 11 is facing the board accommodation space S1.

The peg 12 is made of metal. As shown in FIG. 2, the peg 12 is in the form of a flat plate as a whole. One peg 12 is mounted along the left or right side surface of the connector housing 10 on each of both left and right sides of the board accommodation space S1. A lower end part of the peg 12 is bent to horizontally extend so as to be easily soldered to the pattern formed on a surface of the unillustrated board. In this way, the connector housing 10 is held mounted on the surface of the board via the pegs 12. The peg 12 includes press-fit portions 12D on front and rear ends (see FIG. 1). The pegs 12 are mounted on both left and right side surfaces of the connector housing 10 by press-fitting the press-fit portions 12D into groove portions 10K formed in both left and right surface parts of the connector housing 10 from above. These pegs 12 are line-symmetrically shaped via a lateral center of the connector housing 10.

Each peg 12 includes a plurality of locked portions 12B. Each locked portion 12B of each peg 12 extends in the front-rear direction and a lower side thereof is cut and raised laterally outward. The plurality of locked portions 12B are arranged one above the other on an upper side of each peg 12.

The retainer 13 is integrally formed, such as by bending a metal plate of stainless steel or the like. The retainer 13 includes a retainer body 13A in the form of a rectangular flat plate as a whole and locking portions 13B respectively provided on both ends of the retainer body 13 in the arrangement direction of the cavities 10E. The retainer body 13A is formed with a plurality of through holes 13G arranged side by side in a longitudinal direction and penetrating in a plate thickness direction. The respective through holes 13G correspond to the plurality of projecting portions 10G of the connector housing 10. With the retainer 13 mounted on the connector housing 10, the projecting portions 10G are inserted in the respective through holes 13G (see FIG. 2).

Each locking portion 13B includes an inner wall portion 13C, an upper wall portion 13D, an outer wall portion 13E and a locking body 13F. The inner wall portions 13C are bent to extend upward from the both ends in the longitudinal direction of the retainer body 13A. The upper wall portions 13D extend laterally outward from the tips of the respective inner wall portions 13C. The outer wall portions 13E hang down from the tips of the respective upper wall portions 13D. The locking bodies 13F extend laterally inward from the lower ends of the respective outer wall portions 13E. The respective locking bodies 13F are located lower than the retainer body 13A.

The retainer 13 is so mounted on the connector housing 10 that the retainer body 13A and the inner wall portions 13C are arranged in the board accommodation space S1. The respective outer wall portions 13E are arranged to cover the locked portions 12B of the pegs 12 from laterally outer sides. The locking bodies 13F are locked to the lower ends of the upper or lower locked portions 12B from below. The retainer 13 is mounted on the connector housing 10 via the pegs 12.

For example, if the flexible board 30 is not arranged in the board accommodation space S1, the locking bodies 13F are locked to the lower ends of the respective upper locked portions 12B from below. If the flexible board 30 is arranged in the board accommodation space S1, the locking bodies 13F are locked to the lower ends of the respective lower locked portions 12B from below.

(Configuration of Flexible Board)

An FPC board is adopted as the flexible board 30. The flexible board 30 has flexibility and is configured to be deformable and, even if being deformed, maintain electrical characteristics. For example, a reinforcement plate (not shown) is adhered to the upper surface of an end part 30A of the flexible board 30 to be inserted into the connector housing 10, and the plurality of electrodes 30B extending in the front-rear direction and arranged in parallel to each other are provided in an exposed manner on the lower surface of the end part 30A. A plurality of insertion holes 30C, which are insertion portions formed by cutting between adjacent ones of the electrodes 30B, are formed to penetrate through the flexible board 30. The respective insertion holes 30C correspond to the plurality of projecting portions 10G of the connector housing 10. With the end part 30A of the flexible board 30 inserted in the connector housing 10, the projecting portions 10G are inserted through the respective insertion holes 30C (see FIG. 2).

(Connection of Flexible Board and Terminal Fittings)

The connection of the flexible board 30 and the terminal fittings 11 is described. In a state before the end part 30A of the flexible board 30 is arranged in the board accommodation space S1, the locking bodies 13F of the retainer 13 are locked to the lower ends of the respective upper locked portions 12B from below.

Subsequently, the end part 30A of the flexible board 30 is inserted into the slit 10D of the board insertion portion 10B. Then, the end part 30A contacts the inclined surfaces 10H formed on the projecting portions 10G of the connector housing 10. If being further inserted, the end part 30A is lifted up by the inclined surfaces 10H formed on the projecting portions 10G. If the end part 30A is further inserted, the respective projecting portions 10G are inserted through the respective insertion holes 30C and the lifted-up end part 30A moves down to return to an initial posture (see FIG. 2). At this time, the respective electrodes 30B of the end part 30A contact the spring pieces 11E of the respective terminal bodies 11A. That is, the flexible board 30 includes the plurality of electrodes 30B to be individually connected to the plurality of terminal fittings 11. In this way, the end part 30A is arranged in the board accommodation space S1. At this time, the retainer 13 is in a second arrangement state with respect to the pegs 12 and in a non-pressing state for releasing pressing to the flexible board 30.

Subsequently, the retainer 13 is set in a pressing state for pressing the flexible board 30 toward the terminal fittings 11. Specifically, the locking bodies 13F are locked to the lower ends of the respective lower locked portions 12B from below (see FIG. 2). In this way, the end part 30A of the flexible board 30 is pressed in a direction toward the terminal fittings 11 by the retainer body 13A. Specifically, the end part 30A of the flexible board 30 is slightly lifted up by the spring pieces 11E and the lifted-up end part 30A is pressed downward by the retainer body 13A. That is, the terminal fittings 11 are provided with the spring pieces 11E for resiliently pressing the flexible board 30 and bringing the flexible board 30 and the terminal fittings 11 into contact when the retainer 13 is in the pressing state. At this time, the projecting portions 10G of the connector housing 10 are inserted into the through holes 13G of the retainer 13A (see FIG. 2). At this time, the retainer 13 is in a first arrangement state with respect to the pegs 12 and in the pressing state for pressing the flexible board 30. That is, the retainer 13 sandwiches and holds the flexible board 30 arranged in the board accommodation space S1 between the terminal fittings 11 and the retainer 13. At this time, a state where the projecting portions 10G of the connector housing 10 are inserted through the insertion holes 30C of the flexible board 30 is maintained by the retainer 13 (see FIG. 2). Thus, the flexible board 30 is restricted from coming out from the connector housing 10.

Creepage distances between adjacent ones of the electrodes 30B of the flexible board 30 are secured by the projecting portions 10G inserted through the insertion holes 30C (see FIG. 2).

Next, functions and effects of the first embodiment are described.

The connector 1 of this embodiment includes the connector housing 10, the terminal fittings 11 and the retainer 13. The connector housing 10 includes the board accommodation space S1. The terminal fittings 11 are mounted into the connector housing 10 to face the board accommodation space S1. The retainer 13 sandwiches and holds the flexible board 30 arranged in the board accommodation space S1 between the terminal fittings 11 and the retainer 13. A state of the retainer 13 changes to the pressing state for pressing the flexible board 30 toward the terminal fittings 11 and the non-pressing state for releasing pressing to the flexible board 30. The retainer 13 is made of metal.

According to the configuration of the present disclosure, since the retainer 13 is made of metal, the retainer 13 is less likely to be deformed even if the connector 1 is exposed to a high-temperature and high-humidity atmosphere for a long period of time.

The connector 1 of the present disclosure is provided with the spring pieces 11E for resiliently pressing the flexible board 30 and bringing the flexible board 30 and the terminal fittings 11 into contact when the retainer 13 is in the pressing state.

According to this configuration, even if a dimension between the flexible board 30 and the terminal fittings 11 varies, the flexible board 30 and the terminal fittings 11 can be reliably brought into conduction by the spring pieces 11E.

The connector housing 10 of the connector 1 of the present disclosure is provided with the plurality of terminal fittings 11, and the plurality of spring pieces 11E are arranged to respectively correspond to the plurality of terminal fittings 11.

According to this configuration, even if positional relationships of the plurality of terminal fittings 11 with the flexible board 30 vary, a connected state of each terminal fitting 11 and the flexible board 30 can be satisfactorily established by the spring piece 11E corresponding to each terminal fitting 11.

The connector housing 10 of the connector 1 of the present disclosure includes the wall portions 10F partitioning between adjacent ones of the terminal fittings 11. The flexible board 30 includes the plurality of electrodes 30B to be individually connected to the plurality of terminal fittings 11. The flexible board 30 is formed with the insertion holes 30C by cutting between adjacent ones of the electrodes 30B, and the projecting portions 10G of the wall portions 10F are inserted through the insertion holes 30C.

According to this configuration, the creepage distances between adjacent ones of the electrodes 30B formed on the flexible board 30 can be secured by the projecting portions 10G of the wall portions 10F.

The spring piece 11E of the connector 1 of the present disclosure is integrally provided to the terminal fitting 11.

According to this configuration, since the spring piece 11E is integrally provided in the terminal fitting 11 constituting the configuration for sandwiching the flexible board 30, the number of components can be reduced as compared to the case where the spring piece 11E is provided separately.

The pegs 12 for holding the connector housing 10 mounted on the board are mounted on the connector housing 10 of the connector 1 of the present disclosure. The retainer 13 is in the pressing state when being in the first arrangement state with respect to the pegs 12 and is in the non-pressing state when being in the second arrangement state with respect to the pegs 12.

According to this configuration, since the pegs 12 are separate from the connector housing 10, a material of the pegs 12 can be different from that of the connector housing 10. Since this enables the selection of a material, which is not worn or deformed even if the retainer 13 made of metal is locked, as the material of the pegs 12, the retainer 13 can be reliably held in the pressing state.

Second Embodiment

Figure 4:
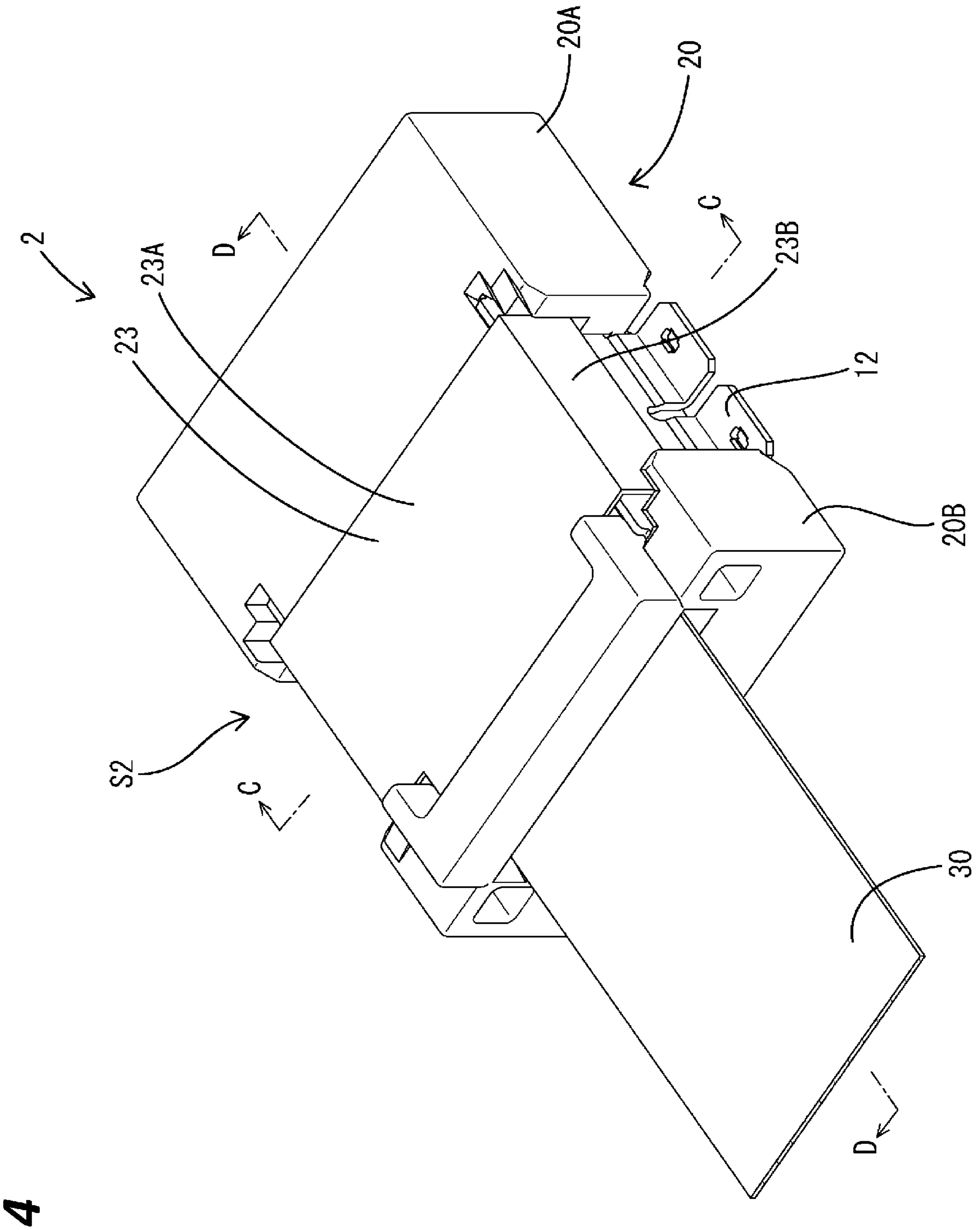
FIG. 4 is a perspective view showing a state where a flexible board is arranged in a board accommodation space and a retainer is in a pressing state in a connector of a second embodiment.

A connector 2 according to a second embodiment of the present disclosure is described with reference to FIGS. 4 to 6. The connector 2 according to the second embodiment is different from the first embodiment in that terminal fittings 21 are strip-like and that a retainer 23 is provided with a spring piece 23C serving as a resilient pressing piece. The same components as in the first embodiment are denoted by the same reference signs and the structures, functions and effects thereof are not described. Note that, in the following description, a side on which a flexible board 30 is inserted into a connector housing 20 (left side in FIG. 6) is referred to as a front side concerning a front-rear direction, and upper and lower sides in FIG. 6 are defined as upper and lower sides concerning a vertical direction. Left and right sides in FIG. 5 are defined as left and right sides concerning a lateral direction.

The terminal fitting 21 is made of metal. As shown in FIG. 6, the terminal fitting 21 is strip-like and formed to extend in the front-rear direction as a whole. A front side of the terminal fitting 21 is a terminal body 21A and a rear side thereof is a board connecting portion 21B. The terminal body 21A is arranged to be higher than the board connecting portion 21B. The terminal body 21A is arranged along the bottom surface of a board accommodation space S2. The terminal body 21A is arranged to face the board accommodation space S2. The front end of the terminal body 21A is facing the rear end of a slit 20D of a board insertion portion 20B. The terminal body 21A includes an embossed portion 21F formed into a curved surface convex upward by being struck. The embossed portion 21F comes into point contact with an electrode 30B of the flexible board 30 (see FIG. 5). The terminal body 21A and the board connecting portion 21B are coupled by an intermediate portion 21C. The intermediate portion 21C is inclined downward toward the board connecting portion 21B from the rear end of the terminal body 21A. A press-fit portion 21D is provided in a rear end part of the terminal body 21A. If the press-fit portion 21D is press-fit into a rear end part of a cavity 20E, the terminal fitting 21 is retained and held in the connector housing 20 by the press-fit portion 21D.

Figure 5:
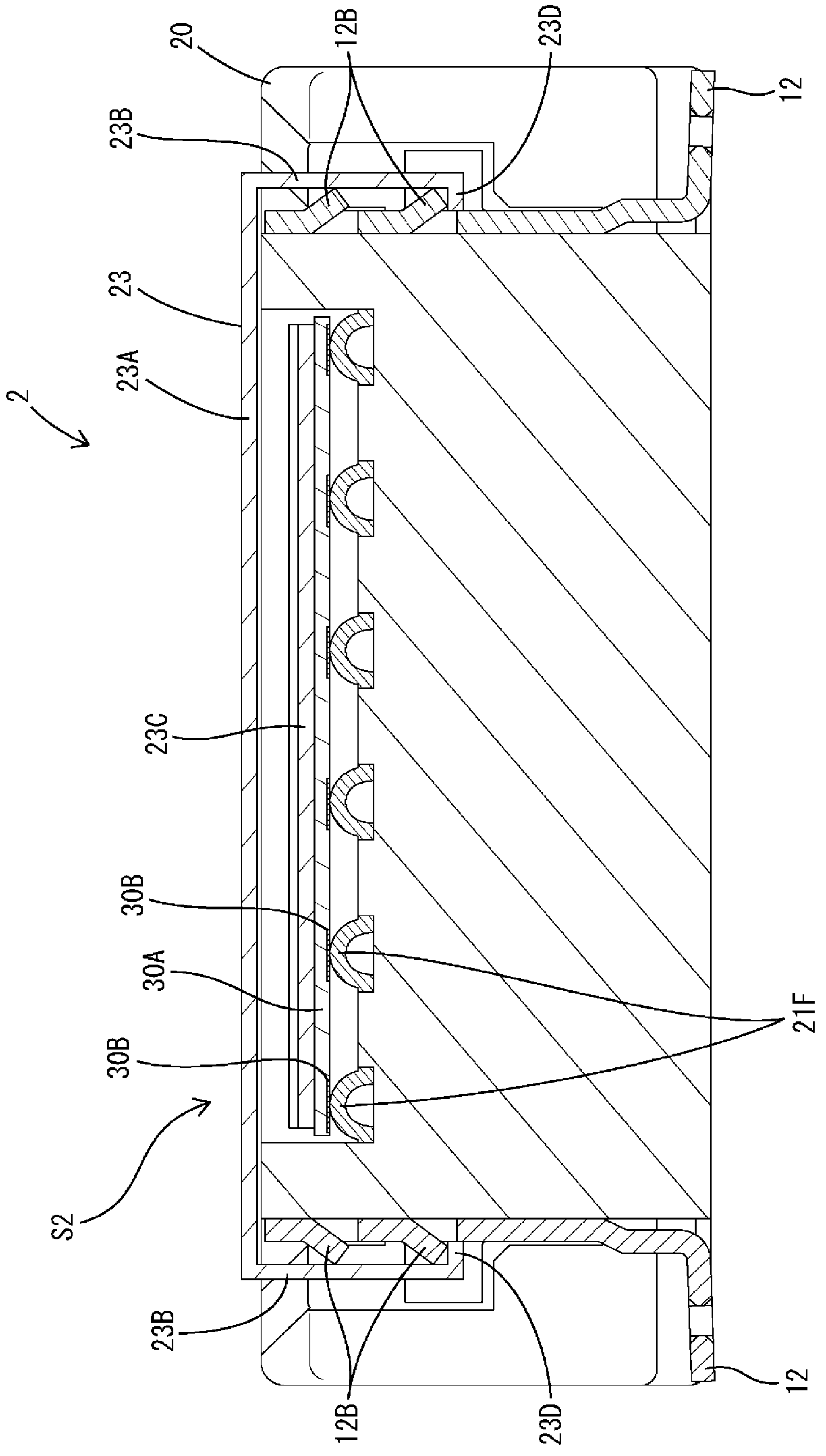
FIG. 5 is a section along C-C in FIG. 4.
Figure 6:
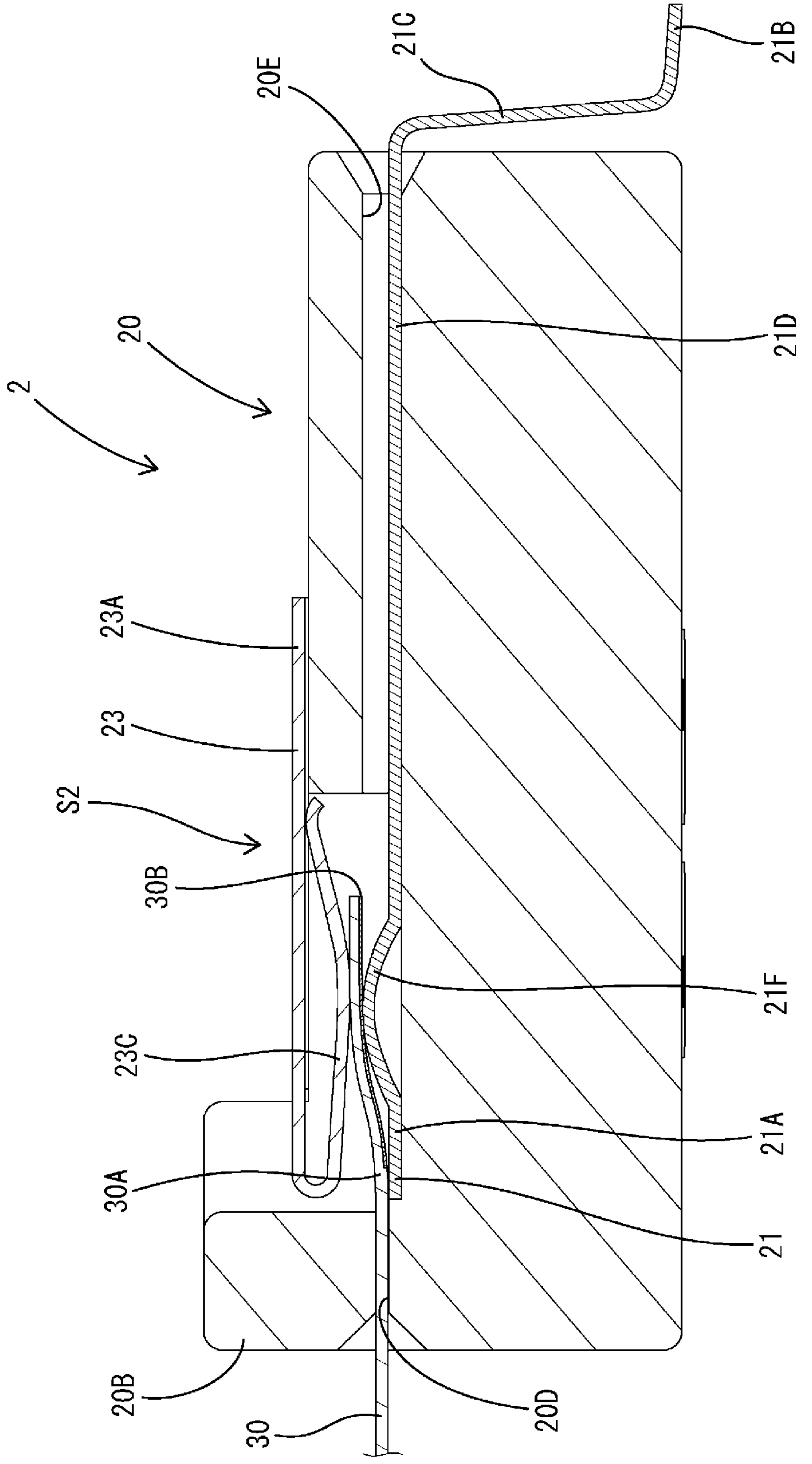
FIG. 6 is a section along D-D in FIG. 4.

As shown in FIG. 5, the retainer 23 includes a retainer body 23A, locking portions 23B and the spring piece 23C serving as a resilient pressing piece. The retainer body 23A is in the form of a rectangular flat plate extending in the lateral direction as a whole. The respective locking portions 23B hang down on both ends of the retainer body 23A in an arrangement direction of the cavities 20E. Locking bodies 23D extending laterally inward are provided on the lower ends of the respective locking portions 23B. The spring piece 23C is folded from the front end edge of the retainer body 23A, extends toward a rear end and is arranged below the retainer body 23A (see FIG. 6). A central part in the front-rear direction of the spring piece 23C is curved downward (see FIG. 6).

The retainer 23 is mounted on the connector housing 20 to cover an upper side of the board accommodation space S2 by the retainer body 23A. The respective locking portions 23B are arranged to cover locked portions 12B of pegs 12 from laterally outer sides. The locking bodies 23D are locked to the lower ends of the upper or lower locked portions 12B from below. The retainer 23 is mounted on the connector housing 20 via the pegs 12.

(Connection of Flexible Board and Terminal Fittings)

The connection of the flexible board 30 and the terminal fittings 21 is described. In a state before an end part 30A of the flexible board 30 is arranged in the board accommodation space S2, the locking bodies 23F of the retainer 23 are locked to the lower ends of the respective upper locked portions 12B from below. At this time, the retainer 23 is in a second arrangement state with respect to the pegs 12. Subsequently, the end part 30A of the flexible board 30 is inserted into the slit 20D of the board insertion portion 20B. Then, the respective embossed portions 21F contact the respective electrodes 30B of the end part 30A. The end part 30A is further inserted while maintaining a state where the respective embossed portions 21F are in contact with the respective electrodes 30B. When the tip of the end part 30A reaches a rear end part of the board accommodation space S2, the retainer 23 is set in a pressing state.

Specifically, the locking bodies 23D are locked to the lower ends of the respective lower locked portions 12B from below (see FIG. 5). Then, the spring piece 23C of the retainer 23 contacts the upper surface (surface to which a reinforcement plate is adhered) of the end part 30A, and is deflected in a direction toward the retainer body 23A. That is, the flexible board 30 is pressed in such a direction that the end part 30A of the flexible board 30 approaches the terminal fittings 21 by the spring piece 23C of the retainer 23. That is, the retainer 23 is provided with the spring piece 23C for resiliently pressing the flexible board 30 and bringing the flexible board 30 and the terminal fittings 21 into contact when the retainer 23 is in the pressing state. At this time, the retainer 23 is in a first arrangement state with respect to the pegs 12 and in the pressing state for pressing the flexible board 30.

The connector 2 of the present disclosure is provided with the spring piece 23C for resiliently pressing the flexible board 30 and bringing the flexible board 30 and the terminal fittings 21 into contact when the retainer 23 is in the pressing state.

According to this configuration, even if a dimension between the flexible board 30 and the terminal fittings 21 varies, the flexible board 30 can be reliably brought into conduction with the terminal fittings 21 by the spring piece 23C.

The spring piece 23C of the connector 2 of the present disclosure is integrally provided to the retainer 23.

According to this configuration, since the spring piece 23C is integrally provided in the retainer 23 constituting a configuration for sandwiching the flexible board 30, the number of components can be reduced as compared to the case where the spring piece 23C is provided separately.

Third Embodiment

Figure 7:
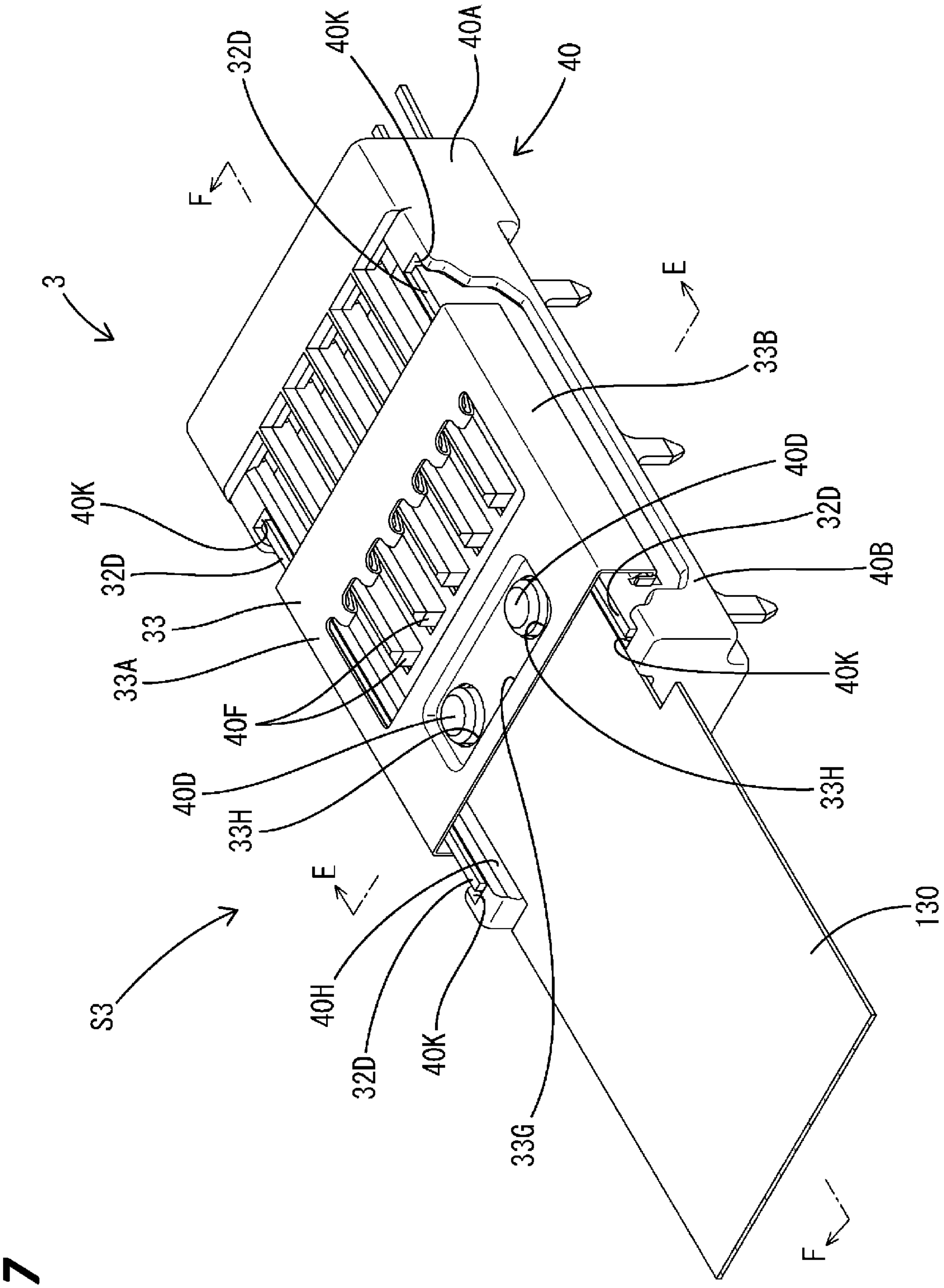
FIG. 7 is a perspective view showing a state where a flexible board is arranged in a board accommodation space and a retainer is in a pressing state in a connector of a third embodiment.
Figure 8:
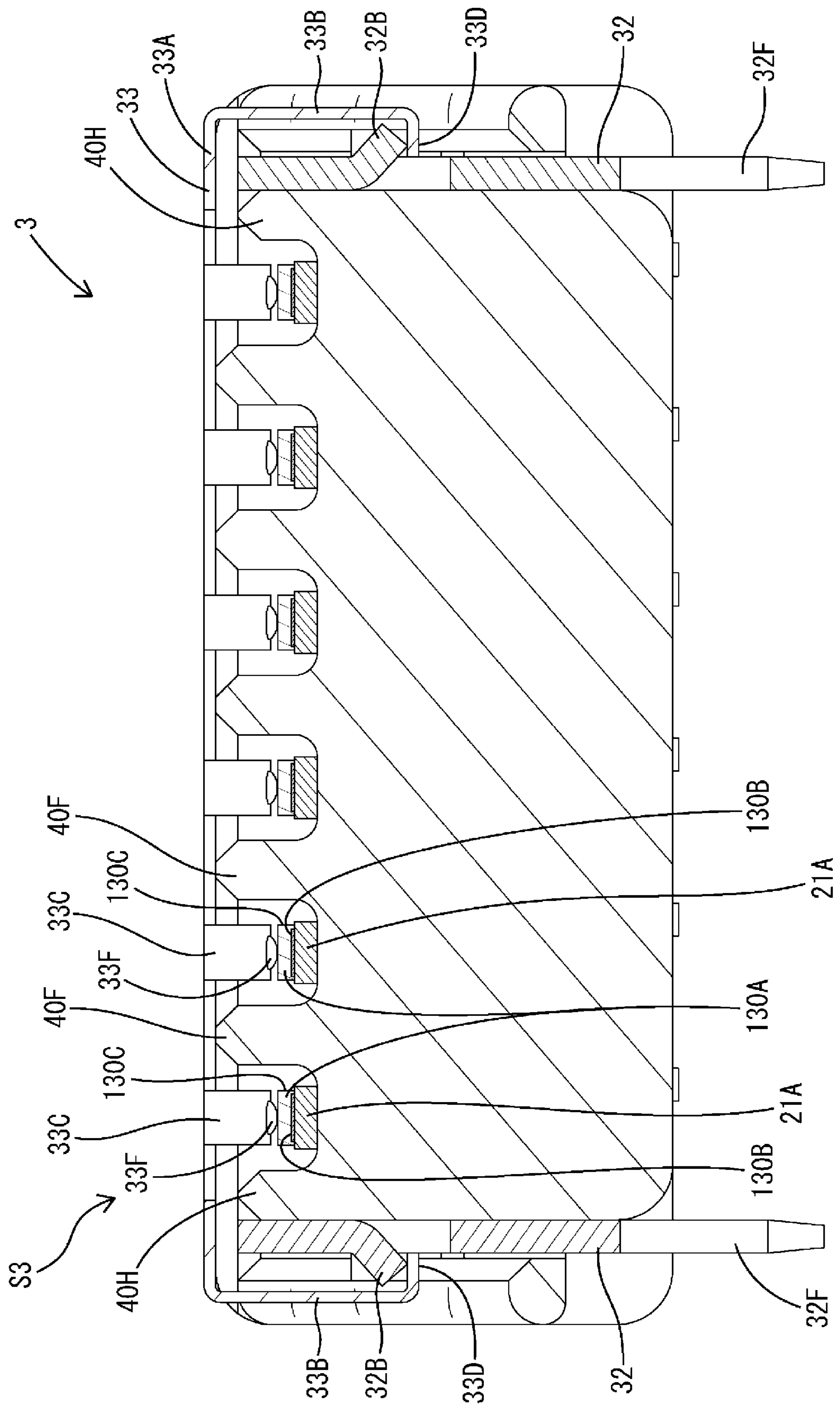
FIG. 8 is a section along E-E in FIG. 7.
Figure 9:
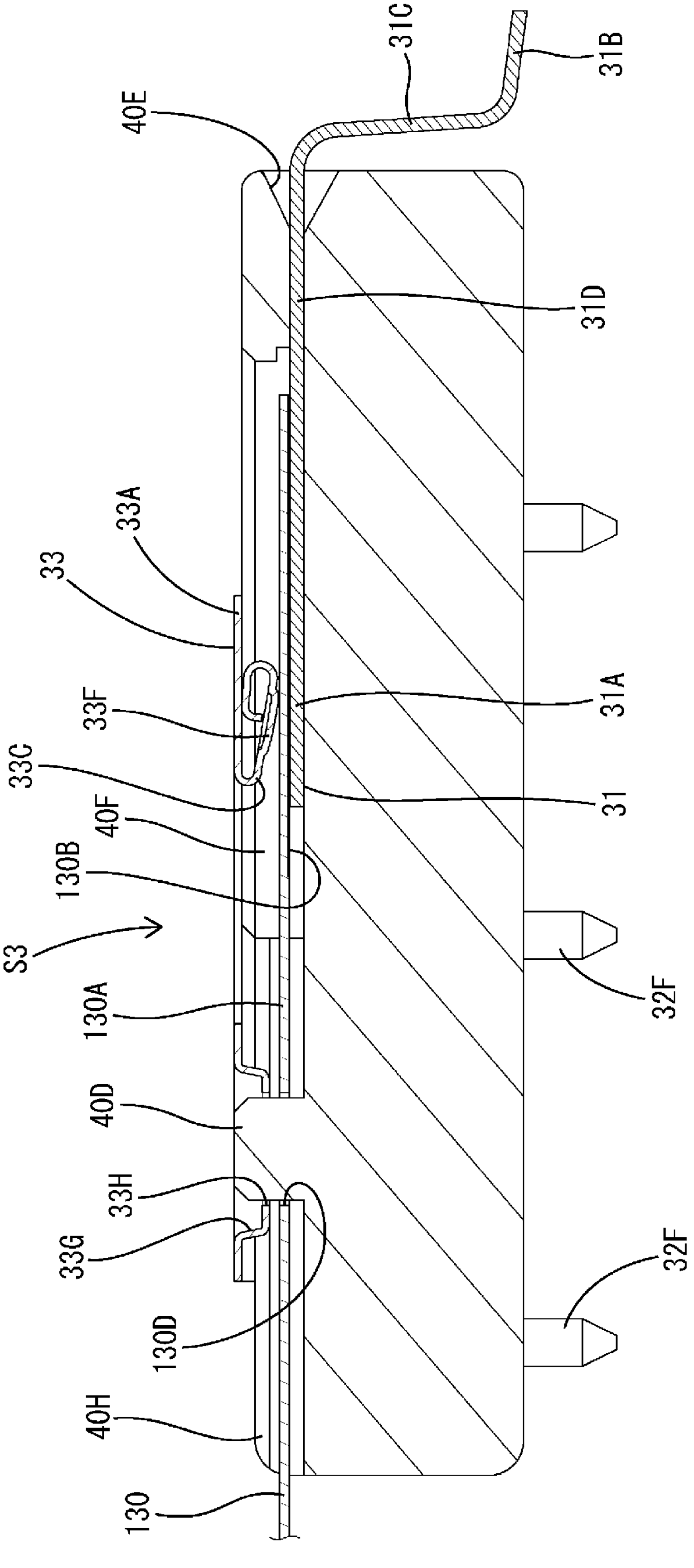
FIG. 9 is a section along F-F in FIG. 7.

A connector 3 according to a third embodiment of the present disclosure is described with reference to FIGS. 7 to 9. The connector 3 according to the third embodiment is different from the first and embodiments in the form of a connector housing 40, the form of pegs 22, the form of terminal fittings 31, the form of a retainer 33, the form of a flexible board 130 and the like. Note that, in the following description, a side on which the flexible board 130 is pulled out from the connector housing 40 (left side in FIG. 9) is referred to as a front side concerning a front-rear direction, and upper and lower sides in FIG. 9 are defined as upper and lower sides concerning a vertical direction. Left and right sides in FIG. 8 are defined as left and right sides concerning a lateral direction.

[Configuration of Connector]

The connector housing 40 includes a terminal holding portion 40A having a substantially rectangular parallelepiped shape and a board arranging portion 40B formed in front of the terminal holding portion 40A. The terminal holding portion 40A includes cavities 40E (see FIG. 9). Wall portions 40F partitioning between adjacent ones of the cavities 40E are provided between the adjacent cavities 40E (see FIG. 8). Each side forming the upper end surface of each wall portion 40F is chamfered (see FIG. 8). In the third embodiment, a board accommodation space S3 includes a region where upper sides of the cavities 40E are open and a region above the board arranging portion 40B. In the board accommodation space S3, the front end of each wall portion 40F is located in a central part in the front-rear direction of the board accommodation space S3.

In the board accommodation space S3, the bottom surface of the board arranging portion 40B and the bottom surfaces of the cavities 40A are formed to be flush (see FIG. 9). Side wall portions 40H standing upward are provided on both left and right sides of the board accommodation space S3 (see FIG. 8). The peripheral edges of the upper end surfaces of the side wall portions 40H are chamfered (see FIG. 8). Two bosses 40D projecting upward are provided side by side in an arrangement direction of the cavities 40E in front of the wall portions 40F of the board accommodation space S3 (see FIG. 7). These bosses 40D have the same outer diameter.

The terminal fitting 31 is made of metal. As shown in FIG. 9, the terminal fitting 31 is strip-like and formed to extend in a front-rear direction as a whole. A front side of the terminal fitting 31 is a terminal body 31A and a rear side thereof is a board connecting portion 31B. The terminal body 31A is arranged to be higher than the board connecting portion 31B. The terminal body 31A is arranged along the bottom surface of a board accommodation space S3. The terminal body 31A is arranged to face the board accommodation space S3. The front end of the terminal body 31A is located rearward of the front ends of the wall portions 40F. The terminal body 31A and the board connecting portion 31B are coupled by an intermediate portion 31C. The intermediate portion 31C is inclined downward toward the board connecting portion 31B from the rear end of the terminal body 31A. A press-fit portion 31D is provided in a rear end part of the terminal body 31A. If the press-fit portion 31D is press-fit into a rear end part of a cavity 40E, the terminal fitting 31 is retained and held in the connector housing 40 by the press-fit portion 31D.

The peg 32 is made of metal. As shown in FIG. 8, the peg 32 is in the form of a flat plate as a whole. One peg 32 is mounted along the left or right side surface of the connector housing 40 on each of both left and right sides of the board accommodation space S3. A lower end part of the peg 32 is provided with a plurality of projections 32F to be inserted through through holes formed in an unillustrated board. In this way, the connector housing 40 is fixed to a surface of the board via the pegs 32. The peg 32 includes a press-fit portion 32D on each of front and rear ends (see FIG. 7). The pegs 32 are mounted on both left and right side surfaces of the connector housing 40 by press-fitting the press-fit portions 32D into groove portions 40K respectively formed in both left and right side surface parts of the connector housing 40. Each peg 32 includes one locked portion 32B. With each peg 32 mounted on the connector housing 40, each locked portion 32B extends in the front-rear direction and a lower side thereof is cut and raised laterally outward.

As shown in FIG. 8, the retainer 33 includes a retainer body 33A, a plurality of locking portions 33B and a plurality of spring pieces 33C serving as resilient pressing pieces. The retainer body 33A is in the form of a rectangular flat plate as a whole. A recess 33G depressed downward is formed on a front side of the retainer body 33A (see FIG. 9). The recess 33G is formed with two through holes 33H arranged side by side in the arrangement direction of the cavities 40E (see FIG. 7). These through holes 33H have the same inner diameter. These through holes 33H correspond to the bosses 40D. The respective locking portions 33 are provided to hang down on both ends of the retainer body 33A in the arrangement direction of the cavities 40E. A locking body 33D extending laterally inward is provided on the lower end of each locking portion 33B.

As shown in FIG. 9, each spring piece 33C is folded from the rear end of an opening formed in a central part in the front-rear direction of the retainer body 33A, extends toward a rear end and is arranged below the retainer body 33A. Each spring piece 33C corresponds to each terminal fitting 31. The spring piece 33C is inclined downward to the rear. A tip side of the spring piece 33C is bent toward the retainer body 33A and folded to extend forward. A base end side of the spring piece 33C includes an embossed portion 33F formed into a curved surface convex downward by being struck. The embossed portion 33F comes into point contact with a surface of an end part 130A of the flexible board 130 to which a reinforcement plate is adhered.

As shown in FIG. 8, the retainer 23 is mounted on the connector housing 40 to cover an upper side of the board accommodation space S3 by the retainer body 33A. The respective locking portions 33B are arranged to cover the locked portions 32B of the pegs 32 from laterally outer sides. The locking bodies 33D are locked to the lower ends of the locked portions 32B from below. The retainer 33 is mounted on the connector housing 40 via the pegs 32.

For example, if the end part 130A is not arranged in the board accommodation space S3, the retainer 33 is not mounted on the connector housing 40. If the end part 130A is arranged in the board accommodation space S3, the locking bodies 33F are locked to the lower ends of the respective locked portions 32B from below.

(Configuration of Flexible Board)

The reinforcement plate (not shown) is adhered to the upper surface of the end part 130A of the flexible board 130 arranged in the connector housing 40. As shown in FIG. 8, a plurality of electrodes 130B are provided in an exposed manner on the lower surface of the flexible board 130. These electrodes 130B extend in the front-rear direction and are arranged in parallel to each other. Slits 130C serving as insertion portions are formed between adjacent ones of the electrodes 130B on the end part 130A. The end part 130A is formed such that a plurality of strip-like shapes are arranged in the lateral direction by these slits 130C (not shown). Each slit 130C corresponds to each of the plurality of wall portions 40F of the connector housing 40. The wall portions 40F are inserted through the respective slits 130C with the end part 130A arranged in the board accommodation space S3. Two insertion holes 130D are formed side by side in a width direction of the flexible board 130 in front of the end part 130A (see FIG. 9). Note that only one insertion hole 130D is shown in FIG. 9. These insertion holes 130D have the same inner diameter. These insertion holes 130D respectively correspond to the two bosses 40D.

(Connection of Flexible Board and Terminal Fittings)

The connection of the flexible board 130 and the terminal fittings 31 is described. In a state before the end part 130A of the flexible board 130 is arranged in the board accommodation space S3, the retainer 33 is not mounted on the connector housing 40. At this time, the retainer 33 is in a second arrangement state with respect to the pegs 32 and in a non-pressing state for releasing pressing to the flexible board 130. Subsequently, the end part 130A of the flexible board 130 is arranged in the board accommodation space S3. At this time, the respective bosses 40D are inserted through the respective insertion holes 130D and the wall portions 40F are inserted through the respective slits 130C.

Subsequently, the retainer 33 is mounted on the connector housing 40 and set in a pressing state. Specifically, the respective bosses 40D are inserted through the respective through holes 33H and the respective spring pieces 33C are arranged between the respective wall portions 40F. Then, the locking bodies 33D of the retainer 33 are locked to the lower ends of the respective locked portions 32B of the pegs 32 from below (see FIG. 8). Then, the respective spring pieces 33C of the retainer 33 contact the upper surface (surface to which the reinforcement plate is adhered) of the end part 130A having the respective electrodes 130B arranged thereon, and are deflected in a direction toward the retainer body 33A. Then, the embossed portions 33F come into point contact with the upper surface of the end part 130A. At this time, the retainer 33 is in a first arrangement state with respect to the pegs 32 and in the pressing state for pressing the flexible board 130. At this time, a state where the bosses 40D of the connector housing 40 are inserted through the insertion holes 130D of the flexible board 130 is held by the retainer 33 (see FIG. 9). Thus, the flexible board 130 is restricted from coming out from the connector housing 40.

The connector housing 40 of the connector 3 of the present disclosure includes the wall portions 40F partitioning between adjacent ones of the terminal fittings 31. The flexible board 130 includes the plurality of electrodes 130B to be individually connected to the plurality of terminal fittings 31. The flexible board 130 is formed with the slits 130C by cutting between adjacent ones of the electrodes 130B, and the wall portions 40F are inserted through the insertion holes 130C.

According to this configuration, creepage distances between adjacent ones of the electrodes 130B formed on the flexible board 130 can be secured by the wall portions 40F.

The pegs 32 for holding the connector housing 40 mounted on the board are mounted on the connector housing 40 of the connector 3 of the present disclosure. The retainer 33 is in the pressing state when being in the first arrangement state with respect to the pegs 32 and is in the non-pressing state when being in the second arrangement state with respect to the pegs 32.

According to this configuration, since the pegs 32 are separate from the connector housing 40, a material of the pegs 32 can be different from that of the connector housing 40. Since this enables the selection of a material, which is not worn or deformed even if the retainer 33 made of metal is mounted, as the material of the pegs 32, the retainer 33 can be reliably held in the pressing state.

Fourth Embodiment

Figure 11:
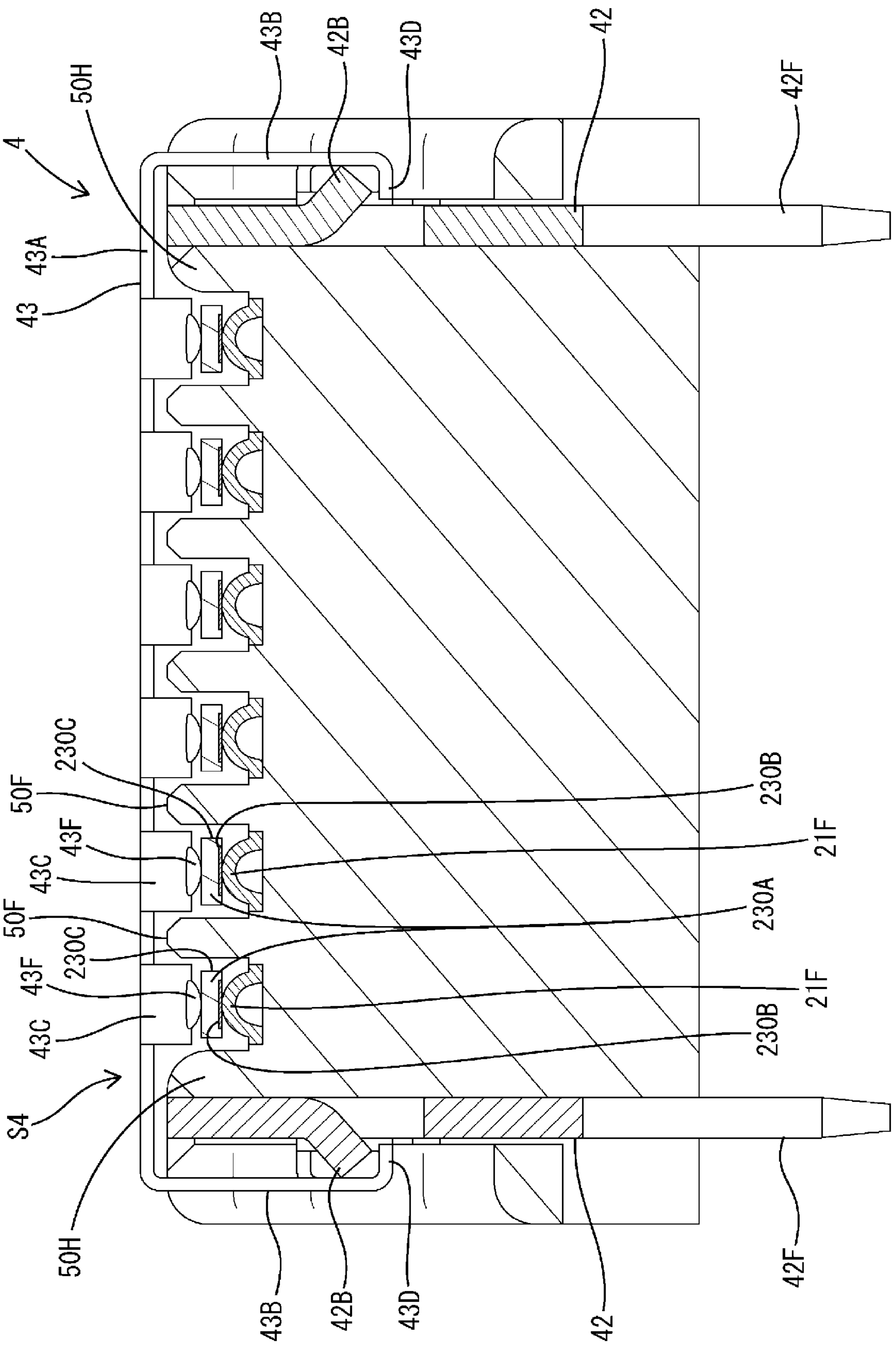
FIG. 11 is a section along G-G in FIG. 10.
Figure 12:
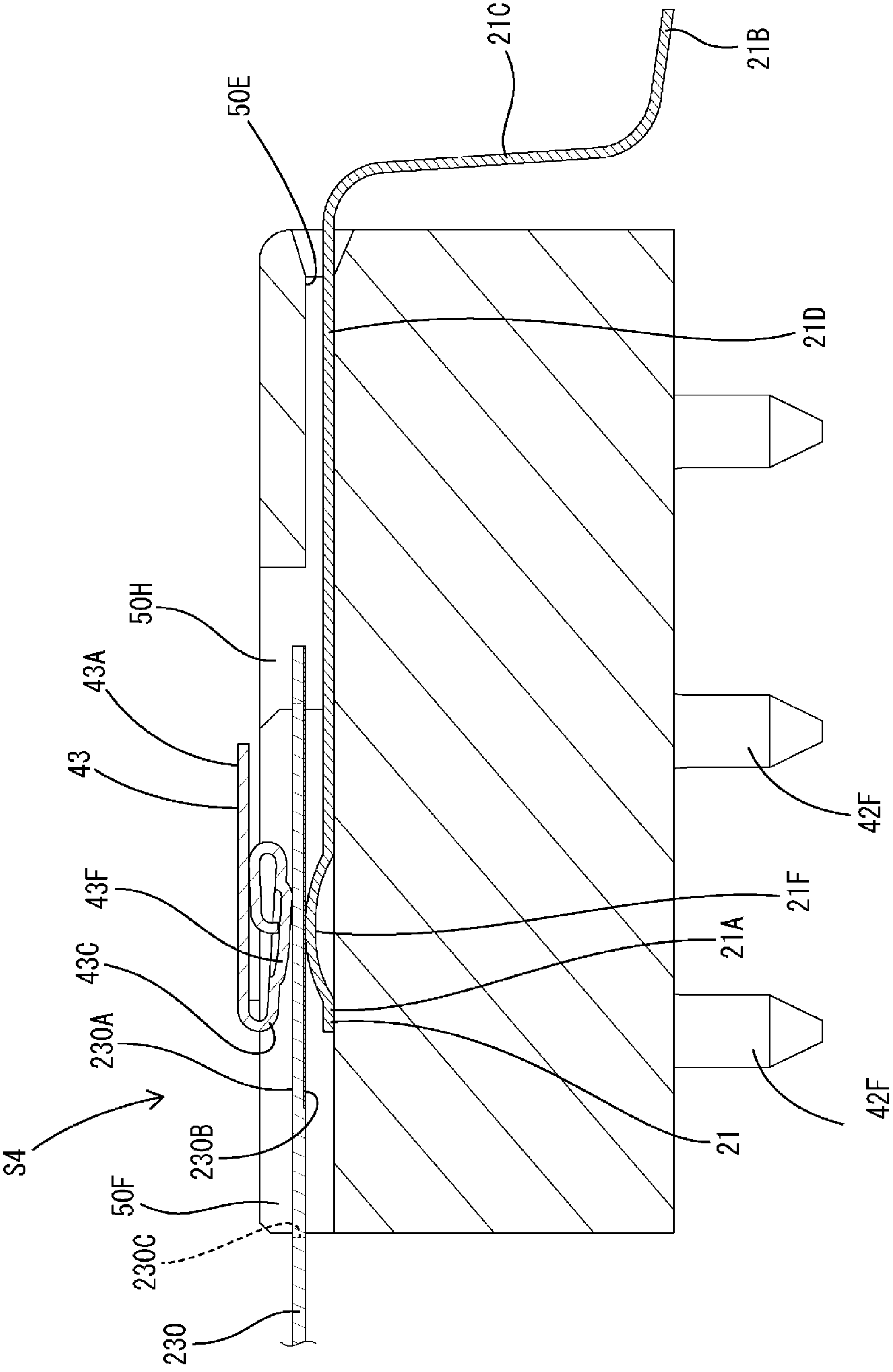
FIG. 12 is a section along H-H in FIG. 10.

A connector 4 according to a fourth embodiment of the present disclosure is described with reference to FIGS. 10 to 12. The connector 4 according to the fourth embodiment is different from the first to third embodiments in that a retainer 43 is mounted rotatably with respect to pegs 42 and that long holes 230C serving as insertion portions are formed between adjacent ones of electrodes 230B of a flexible board 230. The same components as in the first to third embodiments are denoted by the same reference signs and the structures, functions and effects thereof are not described. Note that, in the following description, a side on which the flexible board 230 is pulled out from a connector housing 50 (left side in FIG. 12) is referred to as a front side concerning a front-rear direction, and upper and lower sides in FIG. 12 are defined as upper and lower sides concerning a vertical direction. Left and right sides in FIG. 11 are defined as left and right sides concerning a lateral direction.

[Configuration of Connector]

The connector housing 50 includes a terminal holding portion 50A having a substantially rectangular parallelepiped shape and a board arranging portion 50B formed in front of the terminal holding portion 50A. The terminal holding portion 50A includes cavities 50E (see FIG. 12). A board accommodation space S4 open on an upper side is formed on front sides of the cavities 50E. In the fourth embodiment, the board accommodation space S4 includes a region where upper sides of the cavities 50E are open and a region above the board arranging portion 50B. In the board accommodation space S4, wall portions 50F partitioning between adjacent ones of the cavities 50E are provided between the adjacent cavities 50E (see FIG. 11). The front end of each wall portion 50F is located on the front end of the board accommodation space S4 (i.e. front end of the board arranging portion 50B) (see FIG. 12). Side wall portions 50H standing upward are provided on both left and right sides of the board accommodation space S4 (see FIG. 11).

A terminal body 21A is arranged along the bottom surface of the board accommodation space S4. The terminal body 21A is arranged to face the board accommodation space S4. The front end of the terminal body 21A is located in a central part in the front-rear direction of the board accommodation space S4. An embossed portion 21F comes into point contact with the electrode 230B of the flexible board 230.

As shown in FIG. 11, a lower end part of the peg 42 is provided with a plurality of projections 42F to be inserted through through holes formed in an unillustrated board. The pegs 42 are mounted on both left and right side surfaces of the connector housing 50 by press-fitting press-fit portions 42D into groove portions 50K respectively formed in both left and right side surface parts of the connector housing 50 from above (see FIG. 10).

Figure 10:
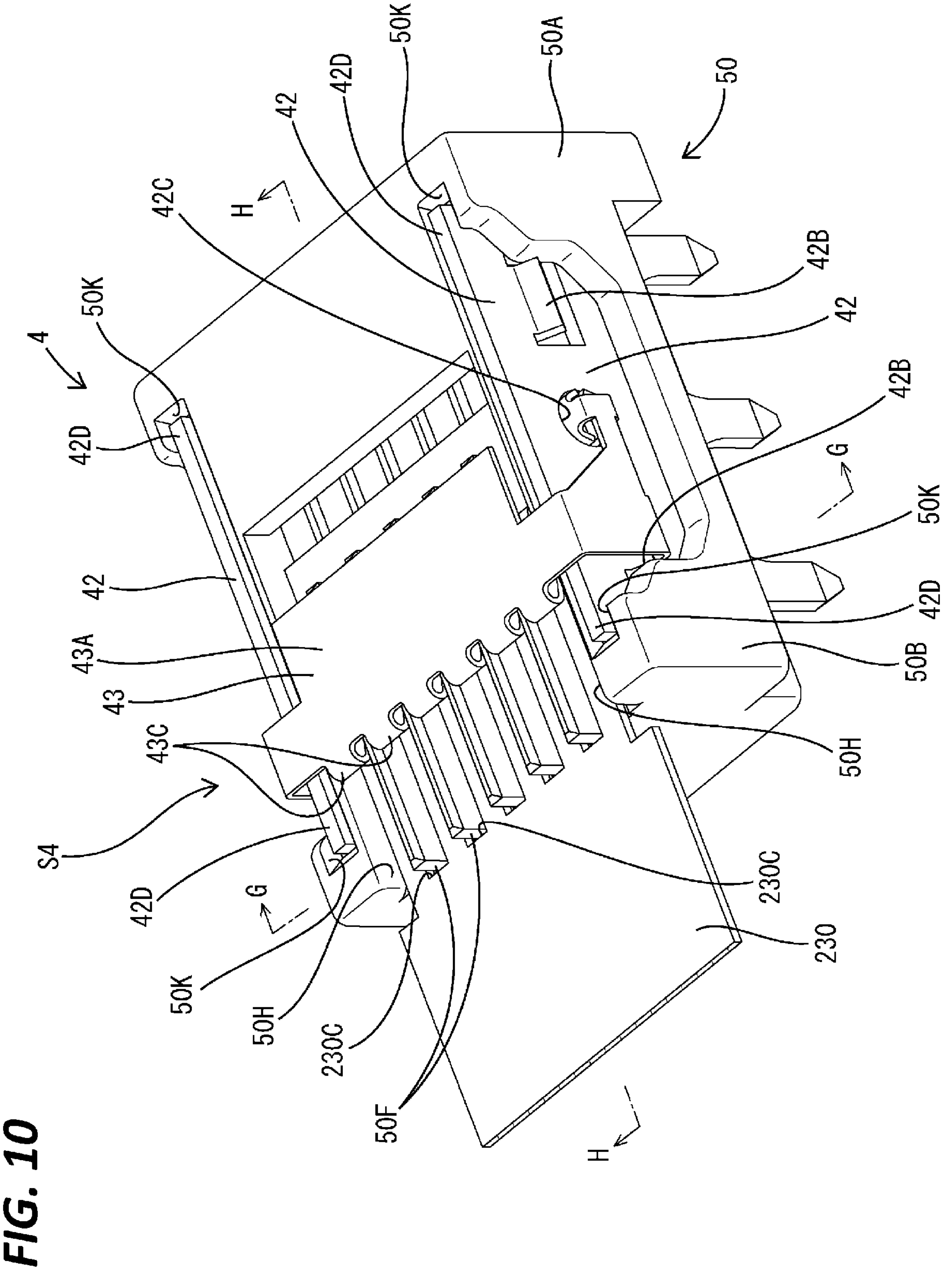
FIG. 10 is a perspective view showing a state where a flexible board is arranged in a board accommodation space and a retainer is in a pressing state in a connector of a fourth embodiment.

Each peg 42 includes two locked portions 42B (see FIG. 10). Each locked portion 42B extends in the front-rear direction and a lower part thereof is cut and raised laterally outward. In each peg 42, the two locked portions 42B are arranged side by side in the front-rear direction. A through hole 42C is formed to penetrate between the two locked portions 42B of each peg 42 (see FIG. 10).

As shown in FIG. 10, the retainer 43 includes a retainer body 43A, a plurality of locking portions 43B, a plurality of spring pieces 43C serving as resilient pressing pieces and a plurality of shaft portions 43E. The retainer body 43A is in the form of a rectangular flat plate as a whole. As shown in FIG. 11, the respective locking portions 43B are provided to hang down on both ends of the retainer body 43A in an arrangement direction of the cavities 50E. A locking body 43D extending laterally inward is provided on the lower end of each locking portion 43B.

As shown in FIG. 12, each spring piece 43C is folded from the front end of the retainer body 43A, extends toward a rear end and is arranged below the retainer body 43A. Each spring piece 43C corresponds to each terminal fitting 21. A tip side of the spring piece 43C is bent toward the retainer body 43A and fold to extend forward. A base end side of the spring piece 43C includes an embossed portion 43F formed into a curved surface convex downward by being struck.

The respective shaft portions 43E are provided on the respective locking portions 43B. The respective shaft portions 43E are locked to the pegs 42. Each shaft portion 43E is bent into a tubular shape projecting laterally inward from each locking portion 43B. The outer shape of each shaft portion 43E is slightly smaller than an inner diameter of the through hole 42C of the peg 42.

The retainer 43 is mounted on the connector housing 50 by inserting the respective shaft portions 43E through the through holes 42C of the pegs 42 from laterally outer sides. The retainer 43 is mounted on the connector housing 50 via the pegs 42.

For example, if an end part 230A of the flexible board 230 is not arranged in the board accommodation space S4, the retainer 43 is in such a state that the locking bodies 43D are not locked to the locked portions 42B with the shaft portions 43E inserted through the through holes 42C of the pegs 42. In this case, the retainer 43 is rotatable about the shaft portions 43E. At this time, the retainer 43 is in a second arrangement state with respect to the pegs 42 and in a non-pressing state for releasing pressing to the flexible board 230. If the end part 230A is arranged in the board accommodation space S4, the locking bodies 43D of the retainer body 43A are locked to the lower ends of the respective locked portions 42B located on front sides of the pegs 42 from below by rotating the retainer 43 about the shaft portions 43E. At this time, the retainer 43 is in a first arrangement state with respect to the pegs 42 and in a pressing state for pressing the flexible board 230.

(Configuration of Flexible Board)

As shown in FIG. 11, the plurality of electrodes 230B are provided in an exposed manner on the lower surface of the flexible board 230. These electrodes 230B extend in the front-rear direction and are arranged in parallel to each other. Long holes 230C extending in the front-rear direction are formed to penetrate between adjacent ones of the electrodes 230B on the end part 230A of the flexible board 230. The long hole 230C corresponds to each of the plurality of wall portions 50F of the connector housing 50. The wall portions 50F are inserted in the respective long holes 230C with the end part 230A arranged in the board accommodation space S4.

(Connection of Flexible Board and Terminal Fittings)

The connection of the flexible board 230 and the terminal fittings 21 is described. In a state before the end part 230A of the flexible board 230 is arranged in the board accommodation space S4, the retainer 43 is in the non-pressing state where the locking bodies 43D are not locked to the locked portions 42B with the shaft portions 43E inserted through the through holes 42C of the pegs 42. Subsequently, the end part 230A of the flexible board 230 is arranged in the board accommodation space S4. At this time, the respective wall portions 50F are inserted through the respective long holes 230C.

Subsequently, the retainer 43 is set in the pressing state. Specifically, the retainer body 43A is brought closer to the board accommodation space S4 by rotating the retainer 43 about the shaft portions 43E with the shaft portions 43E inserted through the through holes 42C of the pegs 42. Then, the locking bodies 43D are locked to the lower ends of the respective locked portions 42B located on the front sides of the pegs 42 from below. At this time, the respective spring pieces 43C are arranged between the respective wall portions 50F (see FIG. 11). Then, the respective spring pieces 43C contact the upper surface (surface to which a reinforcement plate is adhered) of the end part 230A having the respective electrodes 230B arranged thereon, and are deflected in a direction toward the retainer body 43A. Then, the embossed portions 43F come into point contact with the upper surface of the end part 230A. In this way, the retainer 43 rotates about the shaft portions 43E and the state thereof changes to the pressing state and the non-pressing state. In this way, the retainer 43 is set in the pressing state for pressing the flexible board 230. At this time, the flexible board 230 is in such a state as to hold the inserted state of the wall portions 50F in the long holes 230C by the retainer 43 (see FIG. 11). Thus, the flexible board 230 is restricted from coming out from the connector housing 50.

The retainer 43 of the connector 4 of the present disclosure includes the shaft portions 43E to be locked to the pegs 42, and the retainer 43 rotates about the shaft portions 43E to change the state thereof to the pressing state and the non-pressing state.

According to this configuration, the state of the retainer 43 can be easily changed from the non-pressing state to the pressing state without performing an operation of positioning the retainer 43 with respect to the connector housing 50.

Other Embodiments

The present invention is not limited to the above described and illustrated embodiments and is represented by claims. The present invention is intended to include all changes in the scope of claims and in the meaning and scope of equivalents and also include the following embodiments.

(1) Although the use of stainless steel as the material of the retainer is illustrated in the first embodiment, metal of another type may be used.

(2) In the first embodiment, the first arrangement state is a state where the locking bodies of the retainer are locked to the lower locked portions of the pegs and the second arrangement state is a state where the locking bodies of the retainer are locked to the upper locked portions of the pegs. Without limitation to this, the second arrangement state may be a state where the retainer is removed from the pegs.

(3) The resilient pressing pieces may be provided in both the retainer and the terminal fittings.

LIST OF REFERENCE NUMERALS

1, 2, 3, 4 . . . connector
10, 20, 40, 50 . . . connector housing
10A, 40A, 50A . . . terminal holding portion
10B, 20B . . . board insertion portion
10D, 20D . . . slit
10E, 20E, 40E, 50E . . . cavity
10F, 40F, 50F . . . wall portion
10G . . . projecting portion
10H . . . inclined surface
10K, 40K, 50K . . . groove portion
11, 21, 31 . . . terminal fitting
11A, 21A, 31A . . . terminal body
11B, 21B, 31B . . . board connecting portion
11C, 21D, 31D . . . press-fit portion
11E, 23C, 33C, 43C . . . spring piece
12, 22, 32, 42 . . . peg
12B, 32B, 42B . . . locked portion
12D, 32D, 42D . . . press-fit portion
13, 23, 33, 43 . . . retainer
13A, 23A, 33A, 43A . . . retainer body
13B, 23B, 33B, 43B . . . locking portion
13C . . . inner wall portion
13D . . . upper wall portion
13E . . . outer wall portion
13F, 23D, 33D, 43D . . . locking body
13G . . . through hole
21C, 31C . . . intermediate portion
21F, 31F . . . embossed portion
30, 130, 230 . . . flexible board
30A, 130A, 230A . . . end part
30B, 130B, 230B . . . electrode (pattern)
30C . . . insertion hole (insertion portion)
32F, 42F . . . projection
33F, 43F . . . embossed portion
33G . . . recess
33H . . . through hole
40B, 50B . . . board arranging portion
40D . . . boss
40H, 50H . . . side wall portion
42C . . . through hole
43E . . . shaft portion
130C . . . slit (insertion portion)
130D . . . insertion hole
230C . . . long hole (insertion portion)
S, S2, S3, S4 . . . board accommodation space

What is claimed is:

1. A connector, comprising:

a connector housing including a board accommodation space;

a terminal fitting mounted in the connector housing to face the board accommodation space; and a retainer for sandwiching and holding a flexible printed circuit arranged in the board accommodation space between the terminal fitting and the retainer, wherein:

a state of the retainer changes to a pressing state for pressing the flexible printed circuit toward the terminal fitting and a non-pressing state for releasing pressing to the flexible board, the retainer is made of metal, a peg positioned on a side surface of the connector housing and including a vertical flat plate and a lower end part bent horizontally from the flat plate for mounting the connector housing on a board, the flat plate including a plurality of upper and lower locked portions cut and raised laterally outward, the retainer includes an outer wall portion for covering the peg from outside, and the outer wall portion is provided with a locking body extending inward from a lower end of the outer wall portion toward the peg and to be locked to the lower locked portion.

2. The connector of claim 1, wherein:

the retainer is in the pressing state when being in a first arrangement state with respect to the peg and is in the non-pressing state when being in a second arrangement state with respect to the peg.

3. The connector of claim 1, wherein:

the retainer includes a shaft portion to be locked to the peg, and the state of the retainer changes to the pressing state and the non-pressing state by the retainer being rotated about the shaft portion.

4. The connector of claim 1, comprising a resilient pressing piece for resiliently pressing the flexible printed circuit and bringing the flexible printed circuit and the terminal fitting into contact when the retainer is in the pressing state.

5. The connector of claim 4, wherein the resilient pressing piece is provided in at least either one of the retainer and the terminal fitting.

6. The connector of claim 4, wherein:

a plurality of the terminal fittings are provided in the connector housing, and a plurality of the resilient pressing pieces are arranged to respectively correspond to the plurality of terminal fittings.

7. The connector of claim 3, wherein:

the connector housing includes wall portions partitioning between adjacent ones of the terminal fittings, the flexible board includes a plurality of electrode patterns to be individually connected to the plurality of terminal fittings, the flexible printed circuit includes insertion portions formed by cutting between adjacent ones of the electrode patterns, and the wall portions are inserted through the insertion portions.

* * * * *